US005584067A

United States Patent [19]

V. Buer et al.

[11] Patent Number: 5,584,067

[45] Date of Patent: Dec. 10, 1996

[54] DUAL TRAVELING WAVE RESONATOR FILTER AND METHOD

[75] Inventors: Kenneth V. Buer; Bill T. Agar, Jr., both of Chandler, Ariz.

[73] Assignee: Motorola, Inc., Schaumburg, Ill.

[21] Appl. No.: 520,905

[22] Filed: Aug. 30, 1995

Related U.S. Application Data

[63] Continuation of Ser. No. 164,940, Dec. 10, 1993, abandoned.

[51] Int. Cl.[6] ....... H04B 1/26

[52] U.S. Cl. ....... 455/302; 455/304; 455/306; 455/327; 333/116; 333/204; 333/219

[58] Field of Search ....... 455/302, 304, 455/305, 306, 325, 327, 338, 339, 340; 333/110, 116, 204, 219

[56] References Cited

U.S. PATENT DOCUMENTS

| | | | |
|---|---|---|---|
| 2,922,123 | 1/1960 | Cohn | 333/110 |
| 3,560,887 | 2/1971 | Napoli et al. | 333/110 |
| 4,249,263 | 2/1981 | Shinkawa et al. | 455/327 |
| 4,412,351 | 10/1983 | Onishi et al. | 455/327 |
| 4,691,379 | 9/1987 | Shizume | 455/327 |
| 4,706,049 | 11/1987 | Dydyk | 333/204 |
| 4,918,050 | 4/1990 | Dworsky | 333/204 |
| 5,020,148 | 5/1991 | Bonato | 333/116 |

FOREIGN PATENT DOCUMENTS

| | | | |
|---|---|---|---|
| 0010507 | 1/1982 | Japan | 455/302 |
| 0176005 | 7/1988 | Japan | 333/110 |

*Primary Examiner*—Andrew Faile
*Attorney, Agent, or Firm*—Bradley J. Botsch, Sr.

[57] ABSTRACT

A dual traveling wave resonator filter includes a microstrip line to receive an input signal at a first end and first and second traveling wave resonator rings. Each traveling wave resonator ring is in close proximity to the microstrip line such that first and second resonant first combined signals are induced, respectively, in each of the first and second traveling wave resonator rings in response to the input signal on the microstrip line. A band-reject signal is rejected from the microstrip line and a pass-band signal is produced from the microstrip line at a second end.

14 Claims, 1 Drawing Sheet

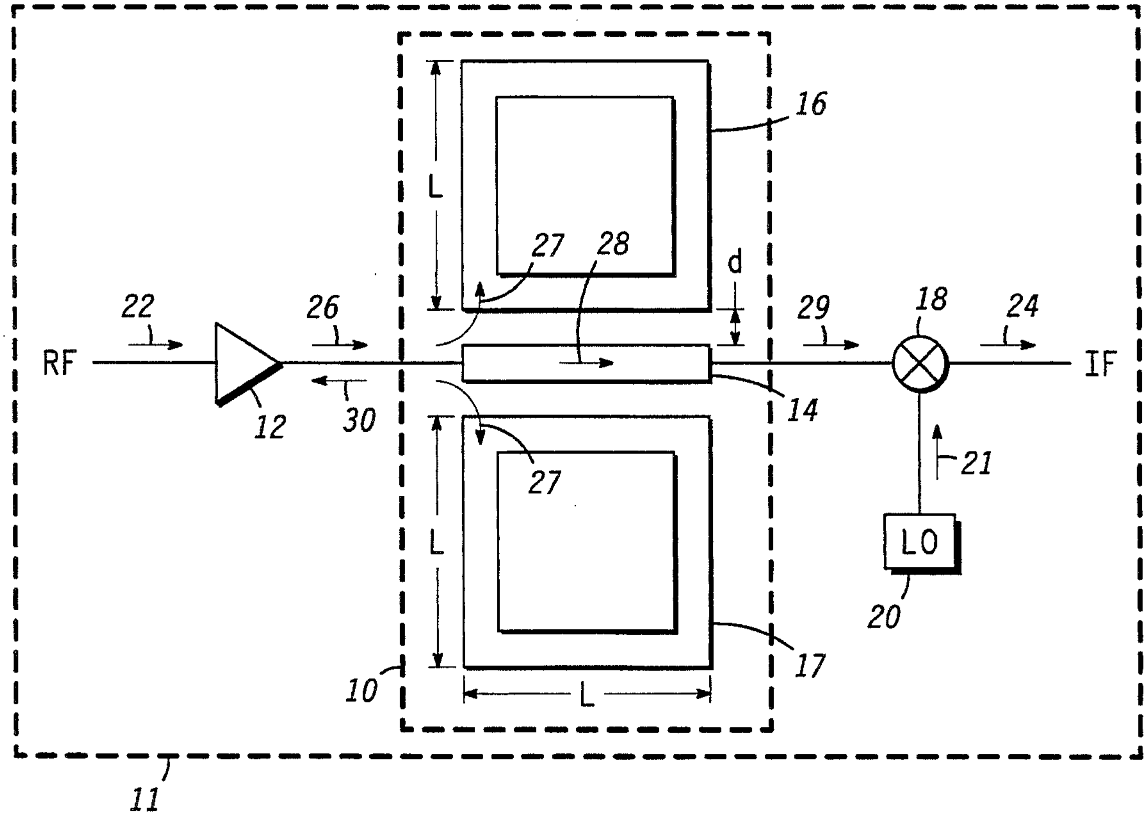
RF
22
12
26
30
16
L
27
28
d
29
18
24
IF
14
27
21
LO
20
L
17
10
L
11

DUAL TRAVELING WAVE RESONATOR FILTER AND METHOD

This application is a continuation of prior application Ser. No. 08/164,940, filed Dec. 10, 1993, abandoned.

BACKGROUND OF THE INVENTION

This invention relates in general to the field of band-reject filters, and in particular to microwave band-reject filters in communications receivers.

Band-reject filters are important in applications such as image noise suppression, suppression of image and local oscillator (LO) signals in mixers, suppression of adjacent channel interference in multi-channel communications systems, and rejection of noise caused by nearby synchronous hardware. While traditional band-reject filters are known, a need exists for a small, low cost, and light weight microwave band-reject filter suitable for the IRIDIUM™ satellite cellular communications system.

One example of where a band-reject filter might be used in a communication system is for receiver image noise suppression. A well-known occurrence in superheterodyne receivers is that the front end low-noise amplifier in such systems will generate thermal noise at the image frequency and that during the downconversion process the image noise will "fold over" onto the thermal noise at the desired receiver frequency. To avoid the associated degradation in system sensitivity, 15–20 decibels (dB) of image noise rejection is required prior to downconversion.

There are two general methods for providing such image rejection in communications receivers. The first uses a bandpass filter (image filter) centered at the desired receive frequency and connected between a low noise amplifier and a downconversion mixer. The bandpass filter is designed to provide 15–20 dB of noise suppression at the image frequency while passing the desired receive frequency (RF). For receiver applications where the intermediate frequency (IF) is very low relative to the RF frequency, the required Q of the image filter can be very high since the percentage difference between the RF and the image frequencies is very small (i.e., the local oscillator (LO) frequency is very close to the RF). High Q filters are typically realized using air dielectric cavity filter configurations. Major drawbacks to this method are that cavity filters are physically large, must be aligned prior to installation into a module, and require input/output transitions between the cavity transmission medium (coaxial, waveguide, etc.) and the planar transmission medium (typically microstrip).

The second method for providing image rejection incorporates a conventional image reject mixer whose topology is designed to downconvert the LO frequency plus the IF and the LO frequency minus the IF sidebands into separate IF output ports. However, considerable mixer complexity and development risk results from this method, especially at the higher microwave frequencies. The mixers must be well matched and the phase relationships well maintained in order to achieve adequate image suppression. In addition, the required local oscillator power for this method is 3 dB higher than that required for a comparable non-image rejection mixer.

Thus, what is needed is a relatively simple, efficient, low-cost, and easily maintained method and apparatus for image suppression in communications receivers in particular, and for band-reject filtering in general. It would be additionally desirable if such a method and apparatus would provide cheap, producible compatibility with most microwave and millimeter wave circuits. It would also be desirable if such a method and apparatus would include a symmetric configuration of traveling wave resonators for maintaining a close-matched passband characteristic impedance in the filter region (with less passband insertion loss) and enhanced coupling and electric field cancellation.

SUMMARY OF THE INVENTION

Accordingly, it is an advantage of the present invention to provide a new dual traveling wave resonator filter and method. It is a further advantage of the present invention to provide new and improved method and apparatus for image noise suppression in communications receivers.

To achieve the above advantages, a dual traveling wave resonator filter is contemplated. The dual traveling wave resonator filter includes a microstrip line to receive an input signal at a first end and first and second traveling wave resonator rings. Each traveling wave resonator ring is in close proximity to the microstrip line such that first and second resonant signals are induced, respectively, in each of the first and second traveling wave resonator rings in response to the input signal on the microstrip line. A band-reject signal is rejected from the input signal on the microstrip line and a pass-band signal is produced from the microstrip line at a second end.

To further achieve the above advantages, a method of band-reject filtering using a dual traveling wave resonator filter is contemplated. The method includes the steps of providing an input signal to a microstrip line at a first end and inducing first and second resonant signals in each of first and second traveling wave resonator rings in response to the presence of the input signal on the microstrip line. A band-reject signal is rejected from the input signal on the microstrip line. A pass-band signal is produced from a second end of the microstrip line.

The above and other features and advantages of the present invention will be better understood from the following detailed description taken in conjunction with the accompanying drawings.

BRIEF DESCRIPTION OF THE DRAWING

In the single sheet of drawings there is shown a diagram of a dual traveling wave resonator filter operating in an application as an image reject mixer in accordance with a preferred embodiment of the invention.

DETAILED DESCRIPTION OF THE DRAWING

The single sheet of drawings illustrates a dual traveling wave resonator filter 10 in accordance with a preferred embodiment of the invention. Such a dual traveling wave resonator filter is suitable for use, for example, in a communications receiver 11, which can be a superheterodyne communications receiver. The major components of dual traveling wave resonator filter 10 include microstrip line 14 and traveling wave resonator rings 16 and 17.

As applied in an image reject mixer application, additional elements include amplifier 12, mixer 18, and local oscillator 20. Amplifier 12 is coupled to a first end of microstrip line 14. Amplifier 12 is preferably a low noise amplifier. RF signal 22 is the input to amplifier 12.

Traveling wave resonator rings 16 and 17 are positioned in close proximity to and on either side of the microstrip line 14. In a preferred embodiment, one segment of each of the traveling wave resonator rings 16 and 17 is parallel to and a distance d away from microstrip line 14. The traveling wave resonator rings 16 and 17, which generally can be of any shape so long as the total path length of each is an integral number of wavelengths of the band reject frequency of interest, may include four segments of microstrip oriented in a square. In such a configuration, first and third segments of each of the traveling wave resonator rings 16 and 17 are parallel to each other and to the microstrip line 14. The distance d may be as close as manufacturing processes allow, and depends on the type of dielectric and material from which the traveling wave resonator rings 16 and 17 and microstrip line 14, etc. are made. In the preferred embodiment, d is on the order of 0.127 mm to 0.254 mm (5 mils to 10 mils). The length of each side of traveling wave resonator rings 16 and 17 is of length L, which is also the length of microstrip line 14. Length L is an integral number of one-fourth wavelengths of the image signal to be rejected. In the preferred embodiment, L is one-quarter of the wavelength of the image signal to be rejected.

Microstrip line 14 carries an input signal 26, input at a first end. Due to the close physical proximity of the portions of traveling wave resonator rings 16 and 17 parallel to microstrip line 14, spaced a distance d apart as shown in FIG. 1, counter-rotational signals 27 are induced on each traveling wave resonator ring 16 and 17. At the reject frequency, one-fourth of the wavelength of the image reject signal fits along length L. Each signal 27 travels a length of 3 times L along traveling wave resonator ring 16 or 17 before it is adjacent to the end of microstrip line 14. Signal 28 travels a length of 1 times L along microstrip line 14. Since a one-fourth wavelength corresponds to a signal phase difference of 90 degrees, a three-fourths wavelength corresponds to a signal phase difference of 270 degrees. Thus, the phase difference between the signals 27 and signal 28 at a second end of microstrip line 14 is the difference between 270 degrees and 90 degrees, or 180 degrees. The dual traveling wave resonator filter thus uses two counter rotational traveling wave resonator rings 16 and 17 to provide phase cancellation resulting in a band-reject type of response as the output of the dual traveling wave resonator filter 10. The phase cancellation occurs at frequencies where the total length of each traveling wave resonator ring 16 or 17 is an even number of wavelengths (at the frequency to be rejected).

In the image reject mixer application, microstrip line 14 carries a first combined signal 26, which comprises a RF signal portion, a RF noise signal portion, and an image noise portion. The 180 degree phase differential between induced signals 27 and signal 28 causes rejection of image noise signal 30 from the second end of microstrip line 14. Image noise signal 30 is sent back or reflected toward amplifier 12. Microstrip line 14 continues to carry a second combined signal, signal 29, which is signal 26 less the image noise signal 30, to mixer 18. Mixer 18 is coupled to the second end of microstrip line 14 to receive signal 29 and to LO 20 to receive LO signal 21. Mixer 18 combines LO signal 21 from LO 20 and signal 29 from microstrip line 14 to produce IF signal 24. IF signal 24 is the output for the image reject mixer application of the dual traveling wave resonator filter 10.

At frequencies where the traveling wave resonator rings 16 and 17 are not resonant (i.e. the pass band), there is very little electric field cancellation because the phase of signal 27 is not 180 degrees out of phase with the signal 28 traveling on microstrip line 14. However, some pass band insertion loss is caused by the discontinuity in characteristic impedance due to the close proximity of the coupled resonator structure.

Thus, a dual traveling wave resonator filter and method has been described which overcomes specific problems and accomplishes certain advantages relative to prior art methods and mechanisms. The improvements over other known technology are significant. First, the dual traveling wave resonator filter can be fabricated in microstrip, making it cheap, easily producible, and compatible with most microwave and millimeter wave circuits. Second, in its application as an image reject filter, the considerable complexity of a conventional image rejection mixer is avoided, which is particularly important at higher microwave frequencies. Third, the relative dielectric constant of the traveling wave resonator substrate material is much higher than that of air, so the size and weight is much smaller than cavity filters. Fourth, only the image frequency couples to the resonator, so the receive frequency "sees" only a single 50 ohm line and does not have to pass through filter input/output transitions. Fifth, the loaded Q of the resonator can be modulated by changing the distance between the resonator and the microstrip line within the limits of the manufacturing processes for the dielectric and microstrip materials of interest.

The dual traveling wave resonator filter and method also offers advantages compared to a single traveling wave resonator ring band-reject filter. The dual traveling wave resonator filter employs two traveling wave resonator rings 16 and 17 coupled to the microstrip line 14 in a manner which can be repeated serially along a longer microstrip line 14 or series of microstrip lines. Such a configuration can provide additional filtering. The second traveling wave resonator ring 17 provides additional signal cancellation without reducing the size of the gap between each traveling wave resonator ring 16 and 17 and the microstrip line 14. In addition, since the signal 28 traveling along the microstrip line 14 has a symmetric electric field pattern, a symmetric filter causes stronger coupling and better electric field cancellation (and filtering). Also, the symmetry of the dual traveling wave resonator filter allows the microstrip through line to be designed to maintain a more closely matched pass band characteristic impedance in the filter region, resulting in less pass band insertion loss. The method and apparatus are well suited to use on the IRIDIUM™ satellite payload K-band converters.

Thus, there has also been provided, in accordance with several embodiments of the invention, a dual traveling wave resonator filter and method that fully satisfies the aims and advantages set forth above. While the invention has been described in conjunction with several specific embodiments, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims.

What is claimed is:

1. A dual traveling wave resonator filter comprising:

a microstrip line to receive an input signal at a first end, wherein the microstrip line has a length which is an integral number of quarter wavelengths of a band-reject signal; and first and second traveling wave resonator rings, each in close proximity to the microstrip line, wherein first and second resonant signals are induced, respectively, in each of the first and second traveling wave resonator rings in response to the input signal on the microstrip line and the band-reject signal is rejected from the input signal on the microstrip line so that a pass-band signal is produced from the microstrip line at a second end, and wherein the first and second traveling wave resonator rings are comprised of microstrip and portions of each of the first and the second traveling wave resonator rings are positioned parallel to and on either side of the microstrip line.

2. A dual traveling wave resonator filter as claimed in claim 1, wherein each of the first and the second traveling wave resonator rings has a length which is an integral number of quarter wavelengths of the band-reject signal.

3. A dual traveling wave resonator filter as claimed in claim 2, wherein each of the first and the second traveling wave resonator rings comprises four segments in a square, wherein a first segment and a third segment of each of the first and the second traveling wave resonator rings are parallel to the microstrip line, each first segment is immediately adjacent to the microstrip line, and the microstrip line is centered between each first segment along the length of the microstrip line.

4. A dual traveling wave resonator filter as claimed in claim 1, wherein the portions of each of the first and the second traveling wave resonator rings positioned parallel to and on either side of the microstrip line are equidistant from the microstrip line.

5. A dual traveling wave resonator image reject mixer comprising:

an amplifier for receiving a receive frequency (RF) signal input and outputting a first combined signal comprising a RF signal, a RF noise signal, and an image noise signal;

a microstrip line coupled to the amplifier, the microstrip line to receive the first combined signal, wherein the microstrip line has a length which is an integral number of quarter wavelengths of a band-reject signal;

first and second traveling wave resonator rings, each in close proximity to the microstrip line wherein first and second resonant first combined signals are induced, respectively, in each of the first and second traveling wave resonator rings in response to the first combined signal on the microstrip line and the image noise signal is rejected from the microstrip line to the amplifier so that a second combined signal is produced from the microstrip line;

a local oscillator for producing a local oscillation frequency signal; and a mixer coupled to the local oscillator and to the microstrip line, the mixer for mixing the second combined signal from the microstrip line with the local oscillation frequency signal from the local oscillator, producing an intermediate frequency output signal.

6. A dual traveling wave resonator image reject mixer as claimed in claim 5, wherein portions of each of the first and the second traveling wave resonator rings are positioned parallel to and on either side of the microstrip line.

7. A dual traveling wave resonator image reject mixer as claimed in claim 6, wherein each of the first and the second traveling wave resonator rings has a length which is an integral number of quarter wavelengths of the image noise signal.

8. A dual traveling wave resonator image reject mixer as claimed in claim 7, wherein each of the first and the second traveling wave resonator rings comprises four segments of microstrip line in a square, wherein a first segment and a third segment of each of the first and the second traveling wave resonator rings are parallel to the microstrip line, each first segment is immediately adjacent to the microstrip line, and the microstrip line is centered between each first segment along the length of the microstrip line.

9. A dual traveling wave resonator image reject mixer as claimed in claim 6, wherein the portions of each of the first and the second traveling wave resonator rings positioned parallel to and on either side of the microstrip line are equidistant from the microstrip line.

10. A communication receiver having a dual traveling wave resonator image reject mixer comprising:

an amplifier for receiving a receive frequency (RF) signal input and outputting a first combined signal comprising a RF signal, a RF noise signal, and an image noise signal;

a microstrip line coupled to the amplifier, the microstrip line to receive the first combined signal, wherein the microstrip line has a length which is an integral number of quarter wavelengths of a band-reject signal;

first and second traveling wave resonator rings, each in close proximity to the microstrip line wherein first and second resonant first combined signals are induced, respectively, in each of the first and second traveling wave resonator rings in response to the first combined signal on the microstrip line and the image noise signal is rejected from the microstrip line to the amplifier so that a second combined signal is produced from the microstrip line;

a local oscillator for producing a local oscillation frequency signal; and a mixer coupled to the local oscillator and to the microstrip line, the mixer for mixing the second combined signal from the microstrip line with the local oscillation frequency signal from the local oscillator, producing an intermediate frequency output signal.

11. A communications receiver as claimed in claim 10, wherein portions of each of the first and the second traveling wave resonator rings are positioned parallel to and on either side of the microstrip line.

12. A communications receiver as claimed in claim 11, wherein each of the first and the second traveling wave resonator rings has a length which is an integral number of quarter wavelengths of the image noise signal.

13. A communications receiver as claimed in claim 12, wherein each of the first and the second traveling wave resonator rings comprises four segments of microstrip line in a square, wherein a first segment and a third segment of each of the first and the second traveling wave resonator rings are parallel to the microstrip line, and each first segment is immediately adjacent to the microstrip line, and the microstrip line is centered between each first segment along the length of the microstrip line.

14. A communications receiver as claimed in claim 11, wherein the portions of each of the first and the second traveling wave resonator rings positioned parallel to and on either side of the microstrip line are equidistant from the microstrip line.

* * * * *

UNITED STATES PATENT AND TRADEMARK OFFICE

CERTIFICATE OF CORRECTION

PATENT NO. : 5,584,067

DATED : December 10, 1996

INVENTOR(S) : Kenneth V. Buer et al.

It is certified that error appears in the above-identified patent and that said Letters Patent is hereby corrected as shown below:

ON THE TITLE PAGE:

In section [19] delete "V." in front of "Buer et al."

Signed and Sealed this

Second Day of September, 1997

*Attest:*

BRUCE LEHMAN

*Attesting Officer*

*Commissioner of Patents and Trademarks*